(12) United States Patent
Nakamura

(10) Patent No.: US 7,532,312 B2
(45) Date of Patent: May 12, 2009

(54) RADAR APPARATUS

(75) Inventor: Mitsuo Nakamura, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/807,683

(22) Filed: May 30, 2007

(65) Prior Publication Data

US 2007/0285649 A1    Dec. 13, 2007

(30) Foreign Application Priority Data

Jun. 7, 2006    (JP)    ............................. 2006-158950

(51) Int. Cl.
*G01C 3/08* (2006.01)

(52) U.S. Cl. ...................... 356/4.07; 356/4.01; 356/4.1; 356/5.1

(58) Field of Classification Search ....... 356/3.01–3.15, 356/4.01–4.1, 5.01–5.15, 6–22
See application file for complete search history.

(56) References Cited

U.S. PATENT DOCUMENTS

| 5,227,834 | A | * | 7/1993 | Ishida et al. | ................... | 396/96 |
| 5,724,124 | A | * | 3/1998 | Kai | ........................... | 356/5.01 |
| 6,522,393 | B2 | * | 2/2003 | Higashino | .................. | 356/3.03 |
| 2002/0015144 | A1 | * | 2/2002 | Seo | ............................ | 356/5.01 |
| 2004/0169840 | A1 | | 9/2004 | Hoashi et al. | | |
| 2004/0207832 | A1 | * | 10/2004 | Ohtomo et al. | ............ | 356/4.01 |

FOREIGN PATENT DOCUMENTS

JP    08-313631    11/1996
JP    2004-177350    6/2004

* cited by examiner

*Primary Examiner*—Thomas H Tarcza
*Assistant Examiner*—Luke D Ratcliffe
(74) *Attorney, Agent, or Firm*—Harness, Dickey & Pierce, PLC

(57) ABSTRACT

The radar apparatus includes a transmit/receive section having a function of emitting a transmission wave, receiving the transmission wave reflected from a reflecting object, and outputting a reception signal having a signal level depending on the intensity of the received transmission wave, a control section controlling the transmit/receive section to transmit the transmission wave a predetermined number of times in the same direction, an integrating section successively integrating the reception signal successively outputted from the transmit/receive section to thereby successively form an integrated signal while the transmit/receive section repeatedly emits the transmission wave in the same direction, and a detector section judging whether or not the integrated signal enables detection of the reflecting object.

6 Claims, 3 Drawing Sheets

RADAR APPARATUS

CROSS-REFERENCE TO RELATED APPLICATION

This application is related to Japanese Patent Application No. 2006-158950 filed on Jun. 7, 2006, the contents of which are hereby incorporated by reference.

BACKGROUND OF THE INVENTION

1. Field of the Invention

The present invention relates to a radar apparatus configured to increase its detection sensitivity by emitting a transmission wave multiple times in the same direction. The radar apparatus of the present invention can be mounted on a vehicle to detect a traveling-ahead vehicle, or an obstacle.

2. Description of Related Art

As described, for example, in Japanese Patent Application Laid-open No. 8-313631, there is known such a radar apparatus used as a light wave distance meter that is configured to transmit a pulsed light, receive the pulsed light reflected from a measurement object, and determine a distance to the measurement object on the basis of a time difference between a moment of emission of the pulsed light and a moment of reception of the reflected pulsed light.

The distance measuring method in such conventional radar is explained in more detail below. First, a light emitting means emits a pulsed light when it is driven by a light emission timing signal. This pulsed light is reflected from the measurement object, and received by a light receiving means where it is converted into a light reception pulse signal having a signal level depending on the intensity of this received pulsed light. This light reception pulse signal is A/D converted in a predetermined sampling cycle. And a set of digital data signals resulting from this A/D conversion, which represent a waveform of the received pulsed light, are stored in a memory circuit. The light emitting means emits the pulsed light multiple times in order to average the digital data signals stored in the memory. A distance to the measurement object can be determined by referring to the digital data signals stored in the memory.

By emitting the pulsed light multiple times to integrate the digital data signals stored in the memory, it is possible to improve the detection sensitivity of the radar apparatus. Accordingly, the above described radar apparatus can accurately measure the distance to the measurement object even when the reception intensity of each individual reflected pulsed light is weak.

However, the reception intensity of the reflected pulsed light varies depending on the reflectivity of the measured object, and the distance to the measured object. Accordingly, such a conventional radar apparatus described above, which is configured to always emit the pulsed light a predetermined number of times, has a problem in that even when the reception intensity of each individual reflected pulsed light is strong, and accordingly the distance measurement can be performed by a fewer number of times of emitting the pulsed light, it always uselessly emits the pulsed light by the predetermined number of times. This may promote degradation of a light source of the pulsed light, and delay detection of the measured object.

SUMMARY OF THE INVENTION

The present invention provides a radar apparatus comprising:

a transmit/receive section having a function of emitting a transmission wave, receiving the transmission wave reflected from a reflecting object, and outputting a reception signal having a signal level depending on an intensity of the received transmission wave;

a control section controlling the transmit/receive section to transmit the transmission wave a predetermined number of times in the same direction;

an integrating section successively integrating the reception signal successively outputted from the transmit/receive section to thereby successively form an integrated signal while the transmit/receive section repeatedly emits the transmission wave in the same direction; and a detector section judging whether or not the integrated signal enables to detect the reflecting object;

the control section controlling the transmit/receive section to stop emission of the transmission wave even when the transmit/receive section has not yet emitted the transmission wave by the predetermined number of times if the detector section judges that the integrated signal enables to detect the reflecting object.

According to the present invention, it becomes possible to prevent a radar apparatus having a capability of emitting a transmission wave multiple times in the same direction in order to increase its detection sensitivity from uselessly emitting the transmission wave after a reflecting object has been detected by a small number of emissions of the transmission wave.

The detector section may be configured to calculate a peak value of a first integrated signal formed by integrating a first number of the reception signals together with a peak time at which the first integrated signal reaches the peak value, calculate a peak value of a second integrated signal formed by integrating a second number of the reception signals together with a peak time at which the second integrated signal reaches the peak value of the second integrated signal, and judge that the reflecting object can be detected by a combination of the first and second integrated signals if the peak time of the first integrated signal substantially coincides with the peak time of the second integrated signal, and a ratio of the peak value of the first integrated signal to the peak value of the second integrated signal substantially coincides with a ratio of the first number to the second number.

The detector section may include a memory storing the first integrated signal until the second integrated signal is formed, and may be configured to replace the peak value and the peak time of the first integrated signal stored in the memory with the peak value and the peak time of the second integrated signal, if the detector section judges that the combination of the first and second integrated signals does not enable to detect the reflecting object.

The detector section may be configured to calculate a peak value of the integrated signal, and judge that the integrated signal enables the detection of the reflecting object if the calculated peak value is larger than a predetermined threshold.

The transmit/receive section may be capable of varying an emission direction in which the transmission wave is emitted, and the control section may be configured to control the transmit/receive section to vary the emission direction if the detector section judges that the integrated signal does not enable the detection of the reflecting object after the transmission wave has been transmitted by the predetermined number of times.

The transmission wave may be a pulsed laser light.

Other advantages and features of the invention will become apparent from the following description including the drawings and claims.

PREFERRED EMBODIMENTS OF THE INVENTION

Figure 1:
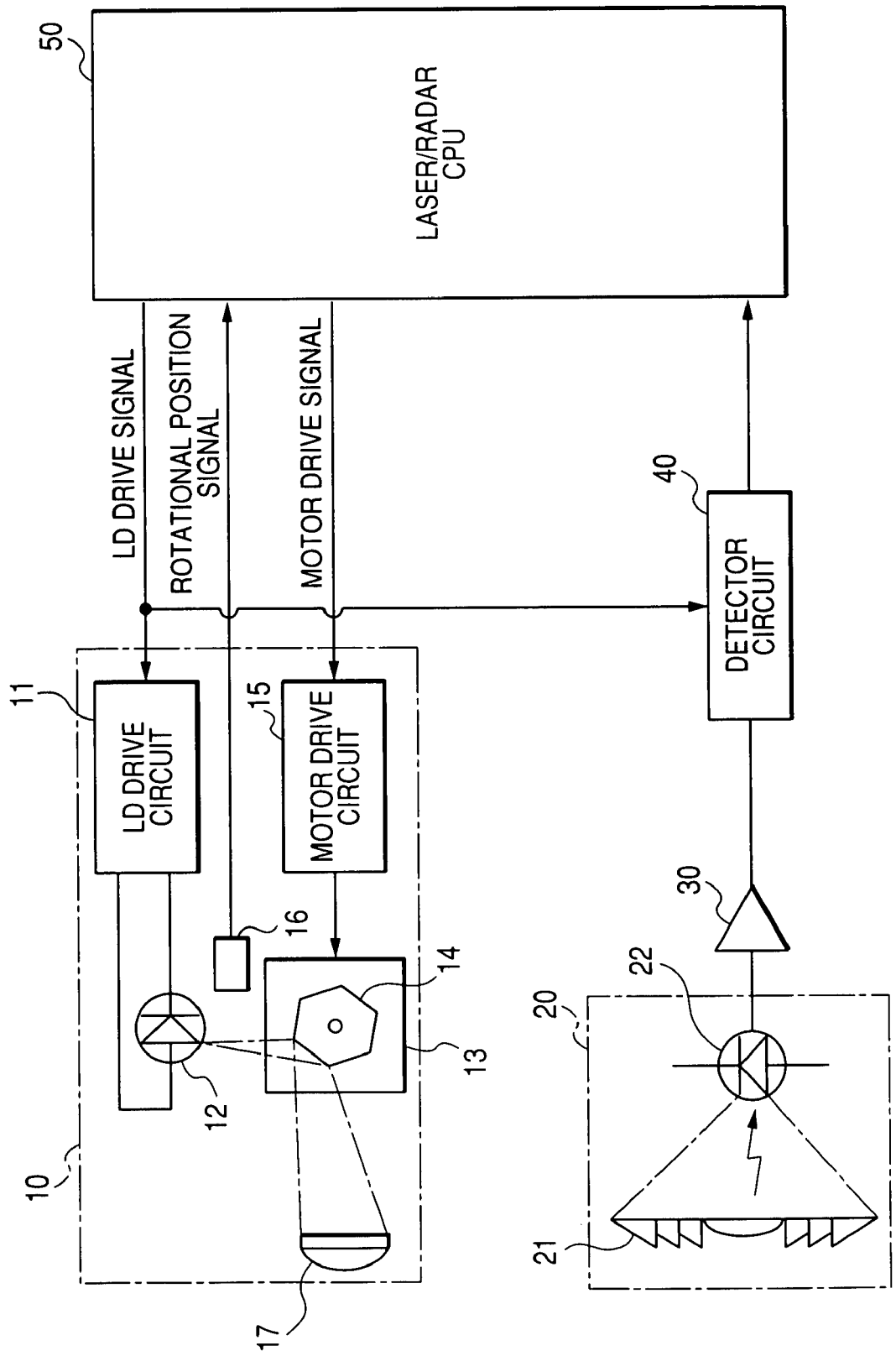
FIG. 1 is a diagram showing an overall structure of a radar apparatus according to an embodiment of the invention.

FIG. 1 is a diagram showing an overall structure of a radar apparatus according to an embodiment of the invention, which is mounted on a vehicle. As shown in this figure, this radar apparatus includes a light emitting section 10, a light receiving section 20, a detector circuit 40, and a laser/radar CPU 50. The light emitting section 10 and the light receiving section 20 are mounted on a front part of the vehicle to detect an object existing ahead of the vehicle.

The light emitting section 10 includes a semiconductor laser diode (referred to simply as a laser diode hereinafter) 12 which emits a pulsed laser light through a scanner 13 and a light emission lens 17. The laser diode 12, which is connected to the CPU 50 through a laser diode drive circuit 11, emits the pulsed laser light when it is applied with an LD drive signal (laser diode drive signal) from the CPU 50.

The scanner 13 is provided with a polygon mirror 14 as a reflector arranged so as to be rotatable by a step motor (not shown) driven by a motor drive circuit 15. Each time a motor drive signal is supplied from the CPU 50 to the motor drive circuit 15, the step motor rotates to rotate the polygon mirror 14 by a predetermined angle. The rotational position of the step motor is detected by a motor rotational position sensor 16, and is outputted to the CPU 50.

The polygon mirror 14 has six mirrors (reflecting surfaces) having different lean angles. Accordingly, by causing the laser diode 12 to emit the pulsed laser light intermittently when the polygon mirror 14 is successively rotated by the predetermined angle, it becomes possible to sweep the laser light in a discontinuous manner within a predetermined angle range in a vehicle-width direction and a vehicle-height direction.

The light receiving section 20 includes a light-receiving lens 21 for receiving the laser light reflected from a light-reflecting object (not shown), and guiding it to a light receiving element (photo diode) 22 which generates a light reception signal (voltage signal) having a signal level depending on the intensity of the received laser light. The light reception signal generated by the light receiving element 22 is amplified by an amplifier 30, and then supplied to the detector circuit 40.

The CPU 50 outputs the LD drive signal to the laser diode drive circuit 11 in such a manner that the laser diode 12 repeatedly emits the laser light in a state where the polygon mirror 14 is stationary. Accordingly, when there exists any light-reflecting object reflecting the laser light, the light receiving element 22 receives the laser lights successively emitted in the same direction and reflected from the light-reflecting object, and generates light reception signals corresponding to the received reflected laser lights.

The CPU 50 causes the laser diode 12 to stop the laser light emission in the same direction when the laser diode 12 has emitted the laser light by a predetermined number of times, or when the CPU 50 receives a light emission stop signal (to be explained later) from the detector circuit 40. After that, the CPU 50 outputs the motor drive signal to the motor drive circuit 15, so that the polygon mirror 14 is rotated by the predetermined angle, and then stopped. In this state where the polygon mirror 14 is stationary, the CPU 50 again outputs the LD drive signal to the laser diode 12 to cause it to repeatedly emit the laser light. Through repetition of the above described operation controlled by the CPU 50, it becomes possible to scan a predetermined angle range in a vehicle-width direction and a vehicle-height direction by the laser light in such a manner that the laser light is emitted multiple times in the same direction.

The detector circuit 40 integrates the light reception signals corresponding to the laser lights emitted in the same direction and reflected from the light-reflecting object to detect the light-reflecting object on the basis of the integrated light reception signals (referred to as an integrated signal hereinafter). By integrating the light reception signals corresponding to the laser lights emitted in the same direction and reflected from the identical light-reflecting object, it becomes possible to detect the light-reflecting object with a high degree of accuracy even when the reception intensity of each individual reflected laser light is weak. In addition, it makes it possible to accurately detect an object having a small width such as a motorcycle, and also to accurately measure a distance to a vehicle even when it is traveling closely ahead.

The reasons of the above are explained in detail below with reference to FIGS. 2A, 2B, and 2C. When there exists a light-reflecting object such as a traveling-ahead vehicle in the direction in which the laser light is emitted, the emitted laser light is reflected from this light-reflecting object and is received by the light receiving section 20. At this time, if the distance to the light-reflecting object is large, or the reflectivity of the light-reflecting object is low due to smudges, for example, the intensity of the reflected laser light is low. In this case, the reception intensity of each individual received reflected laser light becomes weak to such an extent that it is difficult to distinguish it from noise.

To cope with this problem, the laser light is emitted multiple times in the same direction, and the light reception signals resulting from this multiple laser light emission are integrated. By integrating these reception light signals, the intensity of the received laser light is, in effect, enhanced. On the other hand, since the noise superimposed on the received laser light occurs at random, the degree of enhancement of this random noise by the integration of the light reception signals is smaller than that of the received laser light. Hence, by integrating the light reception signals, it becomes possible to improve the reception S/N of the radar apparatus.

It is known from statistical theory that when the light reception signal is integrated M times, the intensity of the received laser light reflected from the light-reflecting object is enhanced by a factor of M, while on the other hand, the intensity of the random noise is enhanced by a factor of $\sqrt{M}$ if it is assumed that the random noise is in accordance with Gaussian distribution. FIG. 2A shows M light reception signals each containing the random noise, which are obtained by M times emission of the laser light in the same direction. Although the M light reception signals are outputted from the light receiving section 20 at different times, they are placed side by side along the same time axis to facilitate explanation and understanding.

Figure 2A:
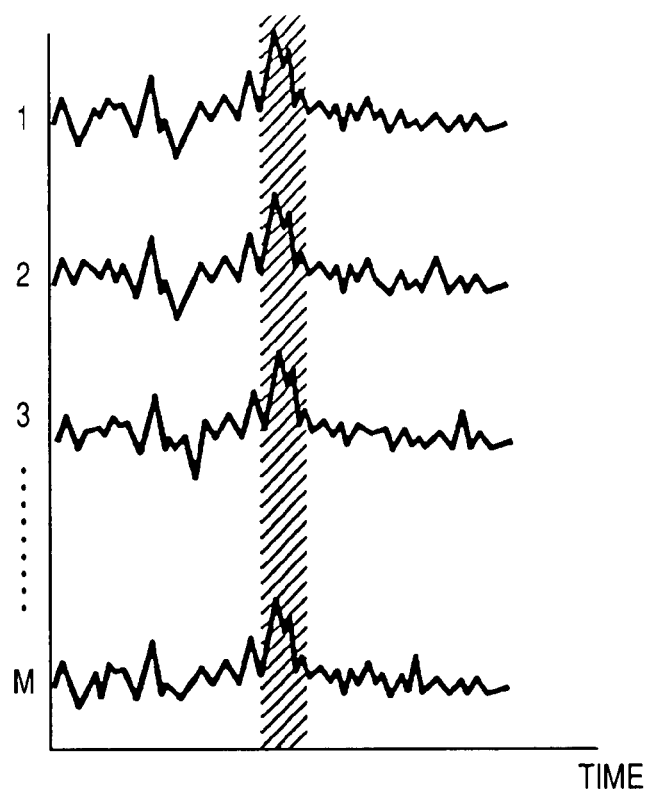
FIG. 2A is a diagram showing M light reception signals containing random noise obtained by M times emission of a laser light in the same direction.
Figure 2B:
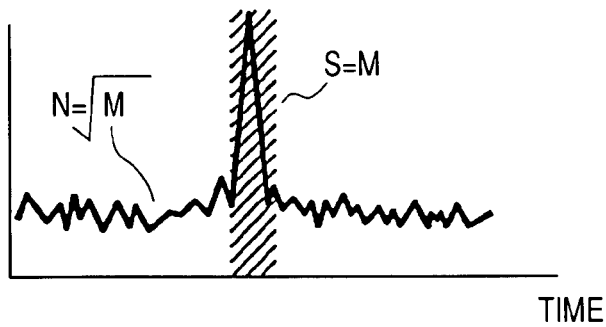
FIG. 2B is a diagram showing an integrated signal formed by integrating the M light reception signals.
Figure 2C:
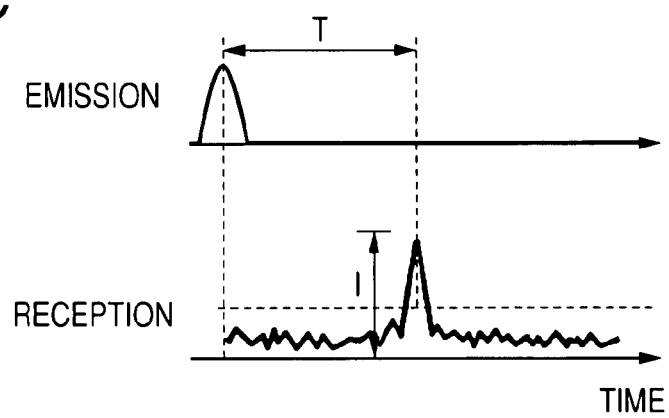
FIG. 2C is a diagram schematically explaining a relationship between a peak time and a peak intensity of the integrated signal.

The peaks of the M light reception signals resulting from the received laser lights reflected from the identical light-reflecting object reside respectively in the shaded areas in FIG. 2A. As seen from FIG. 2A, the waveforms in the shaded areas are hard to be distinguished from waveforms in other areas. Accordingly, it is difficult to extract, from the M light reception signals, their individual peaks.

As explained above, by integrating the M light reception signals, the intensity of the received laser light becomes M times greater in effect, while on the other hand, the intensity of the random noise contained in the received laser light becomes $\sqrt{M}$ times greater in effect. Accordingly, integrating the M light reception signals provides the effect of enhancing only the received laser light, or suppressing the random noise. For example, when M equals to 16, the intensity of the received laser light becomes 16 times greater in effect, while on the other hand, the intensity of the random noise becomes four ($\sqrt{16}$) times greater in effect. In this case, S/N is improved by a factor of 4.

Hence, integrating a plurality of the light reception signals makes it possible to increase a maximum detectable distance to the light-reflecting object, and to detect a light-reflecting object having a low reflectivity.

It should be noted that there is a case in which, before the laser diode 12 emits the laser light by the predetermined number of times, the S/N of the integrated signal reaches a value with which the detector circuit 40 can detect the light-reflecting object. For example, when the light-reflecting object has a high reflectivity for the laser light, the light-reflecting object can be detected by a fewer number of times of the laser light emission.

The laser light emission after the detector circuit 40 succeeded in detecting the light-reflecting object is not only useless, but it also promotes degradation of the laser diode 12, and delays detection of the light-reflection object.

Accordingly, the detector circuit 40 checks whether or not the light-reflecting object can be detected by the current integrated signal. And if it is determined that the light-reflecting object can be detected by the current integrated signal, the detector circuit 40 outputs the light emission stop signal to the CPU 50. In response to this light emission stop signal, the CPU 50 causes the laser diode 12 to stop the emission of the laser light even when the laser light has not yet been emitted by the predetermined number of times, to thereby prevent useless emission.

Next, explanation is given as to how the detector circuit 40 makes judgment as to whether or not the light-reflecting object can be detected by the integrated signal.

The detector circuit 40 makes two kinds of judgments. In a first judging method, it is judged that the light-reflecting object is detectable, if a peak time at which a first integrated signal formed by integrating a first number of the light reception signals reaches its peak intensity substantially coincides with a peak time at which a second integrated signal formed by integrating a second number of the light reception signals reaches its peak intensity, the second number being different from the first number, and if the ratio of the peak intensity of the first integrated signal to that of the second integrated signal is substantially equal to the ratio of the first number to the second number. The above is based on the fact that if the peak times of the first and the second integrated signals, which are formed by integrating different numbers of the light reception signals, substantially coincide with each other, and the ratio between their peak intensities substantially coincide with the ratio between the numbers of their light reception signals having been integrated, it can be regarded that the peak intensities and the peak times are caused by the identical light-reflecting object.

In the second measuring method, it is judged that the light-reflecting object is detectable, if a peak intensity of the integrated signal exceeds a predetermined threshold value. If the light-reflecting object has a high reflectivity for the laser light, there may occur a case in which a peak intensity of the integrated signal formed by integrating a smaller number of the light reception signals, or even the individual light reception signals clearly exceed a noise level. In such a case, comparing the peak intensity of the integrated signal with a predetermined threshold level, it becomes possible to judge promptly whether or not the light-reflecting object is detectable.

The first judging method is explained in more detail below.

The first judging method begins by setting a minimum integration number N. This minimum integration number N indicates a minimum number of times the integration should be performed for the S/N to reach an allowable lower limit. The detector circuit 40 performs an integration process on the light reception signals at least by the number of times indicated by the minimum integration number N. This minimum integration number N is determined depending on a performance of the radar apparatus, a kind of the light-reflecting object. It may be 1.

Next, a peak intensity In of an integrated signal formed by integrating N light reception signals, and a peak time Tn representing a time elapsed between a moment at which the laser light emission is started and a moment at which the integrated signal reaches the peak intensity In are determined when the laser light has been emitted N times. FIG. 2C is a diagram schematically explaining a relationship between the peak time T and the peak intensity.

Subsequently, a peak intensity Im of an integrated signal formed by integrating M (M being larger than N) light reception signals, and a peak time Tm representing a time elapsed between a moment at which the laser light emission is started and a moment at which the integrated signal reaches the peak intensity Im are determined when the laser light has been emitted M times. As explained with reference to FIG. 2A and FIG. 2B, by integrating M light reception signals, the intensity of the received laser light becomes M times greater in effect, while, the intensity of the noise contained in the received laser light becomes $\sqrt{M}$ times greater in effect.

Accordingly, if the peak of the integrated signal formed by integrating the N light reception signals, and the peak of the integrated signal formed by integrating the M light reception signals are caused by the identical light-reflecting object, the following relationships hold.

Peak time: $Tn=Tm$ (1)

Peak intensity: $Im/In=M/N$ (2)

The expression (1) shows that the peak times Tn, Tm of the two integrated signals coincide with each other if the two integrated signals are formed by integrating the light reception signals resulting from the received laser lights reflected from the identical light-reflecting object.

The expression (2) shows that the peak intensity of the integrated signal increases in proportion to the number of times of the integration of the light reception signals if the light reception signals results from the received laser lights reflected from the identical light-reflecting object.

Accordingly, if both the expressions (1) and (2) hold, since it means that the two integrated signals have S/N high enough to detect the light-reflecting object on the basis of the peaks of these integrated signals, the detector circuit 40 outputs the light emission stop signal to the CPU 50.

On the other hand, if at least one of the expression (1) and the expression (2) does not hold, since it means that the peak of at least one of the two integrated signals is caused not from the laser lights reflected from the light-reflecting object but from random noise, and that the N times integration and the M times integration do not provide a sufficiently high S/N, the detector circuit 40 further continues the integration of the light reception signals.

In this case, the peak intensity In and the peak time Tn of the integrated signal formed by integrating the N light reception signals are respectively replaced by the peak intensity Im and the peak time Tm formed by integrating the M light reception signals as shown by the following expressions.

$$N \leftarrow M \quad (3)$$

$$In \leftarrow Im \quad (4)$$

$$Tn \leftarrow Tm \quad (5)$$

After that, it is judged whether or not the expressions (1), (2) hold by use of a peak time Tm' and a peak intensity Im' of a new integrated signal formed by the integration of M' light reception signals, M' being larger than M. The detector circuit 40 performs the above process until the expressions (1), (2) are judged to hold.

The reason why the peak intensity In and the peak time Tn are respectively replaced by the peak intensity Im and the peak time Tm is that the probability that an integrated signal has insufficient S/N, and random noise contained therein is misjudged as being the peak of this integrated signal increases as the number of the light reception signals integrated to form this integrated signal decreases. In a case where such replacement is not performed, when random noise contained in the integrated signal formed by N times integration is misjudged as being its peak, there is no chance that both the expressions (1), (2) hold thereafter, even if a peak of an integrated signal formed by M times integration caused by the light-reflecting object is correctly detected. Accordingly, in this case, the detector circuit 40 continues to judge that there is no peak caused by the light-reflecting object.

In this embodiment, if the number of times of emission of the laser light (that is, the number of times of integration of the light reception signals) reaches a predetermined number (an upper limit number) before the expressions (1), (2) hold, the CPU 50 stops the laser light emission, and the integration of the light reception signals. Such a state occurs, for example, when there exists no light-reflecting object reflecting the laser light.

The integration number M may be increased stepwise by a constant number from the minimum integration number N to make a judgment whether the expressions (1), (2) hold or not. However, it is preferable to successively multiply the integration number M by a factor of 2, so that the expression (2) can be computed by a simple bit-shift operation. This makes it possible to simply a structure of a circuit for computing the expression (2), and to avoid a computation time of expression (2) from becoming long.

Incidentally, since the peak time and the peak intensity of each of the integrated signal formed by N times integrations and the integrated signal formed by M times integrations have some error, it is preferable to judge that the expression (1) (expression (2)) holds when a difference between a left-hand side and a right-hand side of the expression (1) (expression (2)) is within an allowable range determined taking account of such error.

Next, the second judging method is explained. Unlike the first judging method, the second judging method does not use the minimum integration number N. In the second judging method, from the time when the light receiving section 20 starts to output the light reception signal, the detector circuit 40 makes a judgment whether or not the following inequality (6) holds each time the number of the light reception signal having been integrated (may be referred to as "integration number" hereinafter) increases by one until it reaches the upper limit number.

$$Ix > Tx \quad (6)$$

where x is a current integration number, Ix is a peak intensity of an integrated signal formed by x-times integration, and Tx is a threshold value variably set depending on x.

When a threshold value for a peak intensity of the integrated signal formed by the upper limit number of integrations is S, the threshold value Tx is given by expression (7). The threshold value S is predetermined at such a value that enables detecting a peak which is clearly distinguishable from random noise.

$$Tx = (x/\text{upper limit number}) \times S \quad (7)$$

When the expression (6) holds, the emission of the laser light and the integration of the light reception signals are stopped, because the integrated signal is detected to have a strong peak intensity Ix at the time. In a case where no light-reflecting object exists within a laser light emission range, even if the integration is carried out by the upper limit number of times, the expression (6) does not hold. And, as a matter of course, the emission of the laser light and the integration of the light reception signals are not stopped before the integration is carried out by the upper limit number of times in this case.

The first judging method is advantageous when the intensity level of the received laser light is not so different from a noise level. The second judgment is advantageous when the intensity level of the received laser light is sufficiently higher than the noise level. The first judging method makes it possible to detect the light-reflecting object even when the laser light reflected therefrom is weak by comparing the peak time and peak intensity of a first integrated signal formed by a first number of integrations with those of a second integrated signal formed by a second number of integrations, the second number being different from the first number.

The second judging method makes it possible to promptly detect the light-reflecting object when the laser light reflected therefrom is comparatively strong. By performing the first and second judging methods concurrently, it becomes possible to detect the light-reflecting object accurately and promptly irrespective of the distance to the light-reflecting object and the type of light-reflecting object.

Figure 3:
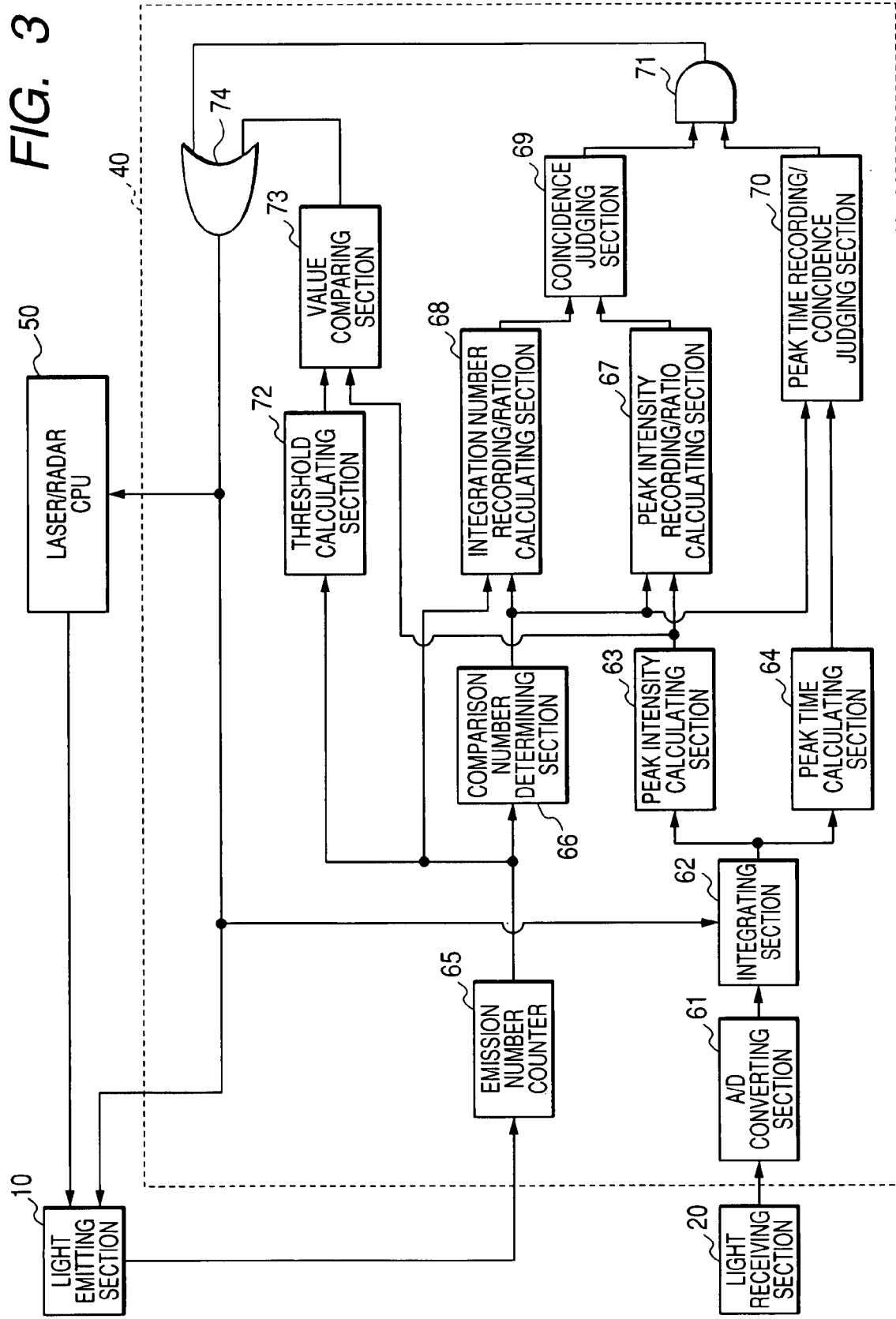
FIG. 3 is a diagram showing the structure of a detector circuit included in the radar apparatus shown in FIG. 1.

Next, the structure of the detector circuit 40 is explained with reference to FIG. 3. As shown in this figure, the detector circuit 40 includes an A/D converting section 61 A/D-converting the light reception signal generated by the light receiving section 20 at predetermined sampling intervals. In this embodiment, the light reception signal to be A/D converted is a signal outputted from the light receiving section 20 during a period from when the laser light is started to be emitted to when a predetermined time (2000 ns, for example) has elapsed since the star of the emission. The A/D converting section 61 converts this light reception signal into a digital data signal at predetermined time intervals (every 25 ns, for example). Accordingly, the light reception signal is represented by a plurality of digital data signals.

An integrating section 62 integrates the light reception signals having been inputted thereto, each of which is represented by a plurality of digital data signals. More specifically, the integrating section 62 aligns these light reception signals side by side along the same time axis as shown in FIG. 2A, and performs summation for each of corresponding digital data signals. As a result, an integrated signal as shown in FIG. 2B is obtained.

This integrated signal is inputted to a peak intensity calculating section 63, and a peak time calculating section 64. The peak intensity calculating section 63 calculates the peak intensity I of the integrated signal. The peak time calculating section 64 calculates the peak time T at which the integrated signal exhibits the peak intensity I. The peak time T calculated by the peak time calculating section 64 is supplied to a peak time recording/coincidence judging section 70.

The peak time calculating section 64 may calculate the peak time T by performing linear interpolation in an area including the peak intensity I in order to improve the accuracy of the peak time T.

The peak intensity I calculated by the peak intensity calculating section 63 is supplied to a peak intensity recording/ratio calculating section 67, and a value comparing section 73.

The detector circuit 40 includes an emission number counter 65 counting the number of times that the laser diode 12 of the light emitting section 10 has emitted the laser light in the same direction on the basis, for example, of the LD drive signal. The count value of the emission number counter 65 is supplied to a comparison number determining section 66, an integration number recording/ratio calculating section 68, and a threshold calculating section 72.

The emission number counted by the emission number counter 65 corresponds to the number of the light reception signals integrated in the integrating section 62. The comparison number determining section 66 outputs a command signal to the peak intensity recording/ratio calculating section 67, the integration number recording/ratio calculating section 68, and the peak time recording/coincidence judging section 70 when the count value of the emission number counter 65 shows that the number of the light reception signals having been integrated has reached the minimum integration number N, or reached the integration number M.

The integration number recording/ratio calculating section 68 records, upon receiving the command signal from the comparison number determining section 66, the count value of the emission number counter 65 as the light reception signal integration times at the time. In addition, in a case where the minimum integration number N has been already recorded, the integration number recording/ratio calculating section 68 calculates the ratio of the integration number M newly recorded to the minimum integration number N, and outputs it to a coincidence judging section 69.

The integration number recording/ratio calculating section 68 also performs a replacement process in which the minimum integration number N having been recorded is erased, and the recorded integration number M is set at a new minimum integration number N.

The peak intensity recording/ratio calculating section 67 records, upon receiving the command signal from the comparison number determining section 66, the peak intensity I outputted from the peak intensity calculating section 63 at the time. In addition, in a case where the peak intensity In corresponding to the minimum integration number N has been already recorded, the peak intensity recording/ratio calculating section 67 calculates the ratio of the peak intensity Im newly recorded to the peak intensity In, and outputs it to the coincidence judging section 69.

Like the integration number recording/ratio calculating section 68, the peak intensity recording/ratio calculating section 67 also performs a replacement process in which the recorded peak intensity Im is set at a new peak intensity In corresponding to the minimum integration number N.

The coincidence judging section 69 judges whether or not the ratio Im/In calculated by the peak intensity recording/ratio calculating section 67 coincides with the ratio M/N calculated by the integration number recording/ratio calculating section 68. If it is judged that they coincide with each other, the coincidence judging section 69 outputs a coincidence signal to an AND circuit 71.

The peak time recording/coincidence judging section 70 records, upon receiving the command signal from the comparison number determining section 66, the peak time T outputted from the peak time calculating section 64 at the time. In addition, in a case where the peak time Tn corresponding to the minimum integration number N has been already recorded, the peak time recording/coincidence judging section 70 judges whether or not this peak time Tn coincides with the newly recorded peak time Tm. If it is judged that they coincide with each other, the peak time recording/coincidence judging section 70 outputs a coincidence signal to the AND circuit 71.

Like the integration number recording/ratio calculating section 68, and the peak intensity recording/ratio calculating section 67, the peak time recording/coincidence judging section 70 also performs a replacement process in which the recorded peak time Tm is set at a new peak time Tn corresponding to the minimum integration number N.

The AND circuit 71 outputs a high level signal when both the coincidence judging section 69 and the peak time recording/coincidence judging section 70 output the coincidence signal. This high level signal outputted from the AND circuit 71 is supplied, as the light emission stop signal, to the laser radar CPU 50, the light emitting section 10, and the integrating section 62 through an OR circuit 74 in order to stop the laser light emission and the light reception signal integration.

As understood from the above, the peak intensity recording/ratio calculating section 67, the integration number recording/ratio calculating section 68, the coincidence judging section 69, the peak time recording/coincidence judging section 70, and the AND circuit 71 mainly constitute a configuration to perform the first judging method.

The threshold calculating section 72 calculates the threshold value Tx for the light reception signal integration number X in accordance with the expression (7) on the basis of the count value of the emission number counter 65, and outputs it to the value comparing section 73. The value comparing section 73 compares the threshold value Tx outputted from the threshold calculating section 72 with the peak intensity Ix outputted from the peak intensity calculating section 63. The value comparing section 73 outputs a high level signal to the OR circuit 74 when it judges that the peak intensity Ix is larger than the threshold value Tx.

Accordingly, also in this case, the light emission stop signal is outputted from the OR circuit 74 in order to stop the laser light emission and the light reception signal integration. As understood from the above, the threshold calculating section 72, and the value comparing section 73 mainly constitute a configuration to perform the second judging method.

Although the present invention has been described with reference to preferred embodiment, it is to be noted that various changes will be apparent to those skilled in the art.

For example, although the radar apparatus of the present invention has been described as being a vehicle-mounted radar in the above embodiment, the radar apparatus of the present invention can be used to detect intruders into a given area. In this case, the direction of emission of the laser light may be fixed or varied depending on the shape and size of the area.

The above explained preferred embodiments are exemplary of the invention of the present application which is described solely by the claims appended below. It should be understood that modifications of the preferred embodiments may be made as would occur to one of skill in the art.

What is claimed is:

1. A radar apparatus comprising:
a transmit/receive section having a function of emitting a transmission wave, receiving said transmission wave reflected from a reflecting object, and outputting a reception signal having a signal level depending on an intensity of said received transmission wave;
a control section controlling said transmit/receive section to transmit said transmission wave a predetermined number of times in the same direction;
an integrating section successively integrating said reception signal successively outputted from said transmit/receive section to thereby successively form an integrated signal while said transmit/receive section repeatedly emits said transmission wave in the same direction; and
a detector section judging whether or not said integrated signal enables detection of said reflecting object on the basis of S/N of said integrated signal;
said control section controlling said transmit/receive section to stop emission of said transmission wave even when said transmit/receive section has not yet emitted said transmission wave by said predetermined number of times if said detector section judges that said integrated signal enables detection of said reflecting object; wherein
said detector section is configured to calculate a peak value of a first integrated signal formed by integrating a first number of said reception signals together with a peak time at which said first integrated signal reaches said peak value, calculate a peak value of a second integrated signal formed by integrating a second number of said reception signals together with a peak time at which said second integrated signal reaches said peak value of said second integrated signal, and judge that said reflecting object can be detected by a combination of said first and second integrated signals if said peak time of said first integrated signal substantially coincides with said peak time of said second integrated signal, and a ratio of said peak value of said first integrated signal to said peak value of said second integrated signal substantially coincides with a ratio of said first number to said second number.

2. A radar apparatus comprising:
a transmit/receive section having a function of emitting a transmission wave, receiving said transmission wave reflected from a reflecting object, and outputting a reception signal having a signal level depending on an intensity of said received transmission wave;
a control section controlling said transmit/receive section to transmit said transmission wave a predetermined number of times in the same direction;
an integrating section successively integrating said reception signal successively outputted from said transmit/receive section to thereby successively form an integrated signal while said transmit/receive section repeatedly emits said transmission wave in the same direction; and
a detector section judging whether or not said integrated signal enables detection of said reflecting object on the basis of S/N of said integrated signal;
said control section controlling said transmit/receive section to stop emission of said transmission wave even when said transmit/receive section has not yet emitted said transmission wave by said predetermined number of times if said detector section judges that said integrated signal enables detection of said reflecting object; wherein
said detector section is configured to calculate a peak value of a first integrated signal formed by integrating a first number of said reception signals together with a peak time at which said first integrated signal reaches said peak value and calculate a peak value of a second integrated signal formed by integrating a second number of said reception signals together with a peak time at which said second integrated signal reaches said peak value of said second integrated signal, and
said detector section includes a memory storing said first integrated signal until said second integrated signal is formed, and is configured to replace said peak value and said peak time of said first integrated signal stored in said memory with said peak value and said peak time of said second integrated signal, if said detector section judges that said combination of said first and second integrated signals does not enable detection of said reflecting object.

3. The radar apparatus according to claim 1, wherein said detector section is configured to calculate a peak value of said integrated signal, and judge that said integrated signal enables detection of said reflecting object if said calculated peak value is larger than a predetermined threshold.

4. The radar apparatus according to claim 1, wherein said transmit/receive section is capable of varying an emission direction in which said transmission wave is emitted, and said control section is configured to control said transmit/receive section to vary said emission direction if said detector section judges that said integrated signal does not enable detection of said reflecting object after said transmission wave has been transmitted by said predetermined number of times.

5. The radar apparatus according to claim 1, wherein said transmission wave is a pulsed laser light.

6. The radar apparatus according to claim 1, wherein said detector section judges whether or not said reflecting object is detectable by comparing a peak intensity of said integrated signal with a predetermined threshold value.

* * * * *